Feb. 19, 1957 J. A. WHEELER 2,782,158
NEUTRONIC REACTOR
Filed Nov. 2, 1945 4 Sheets-Sheet 3

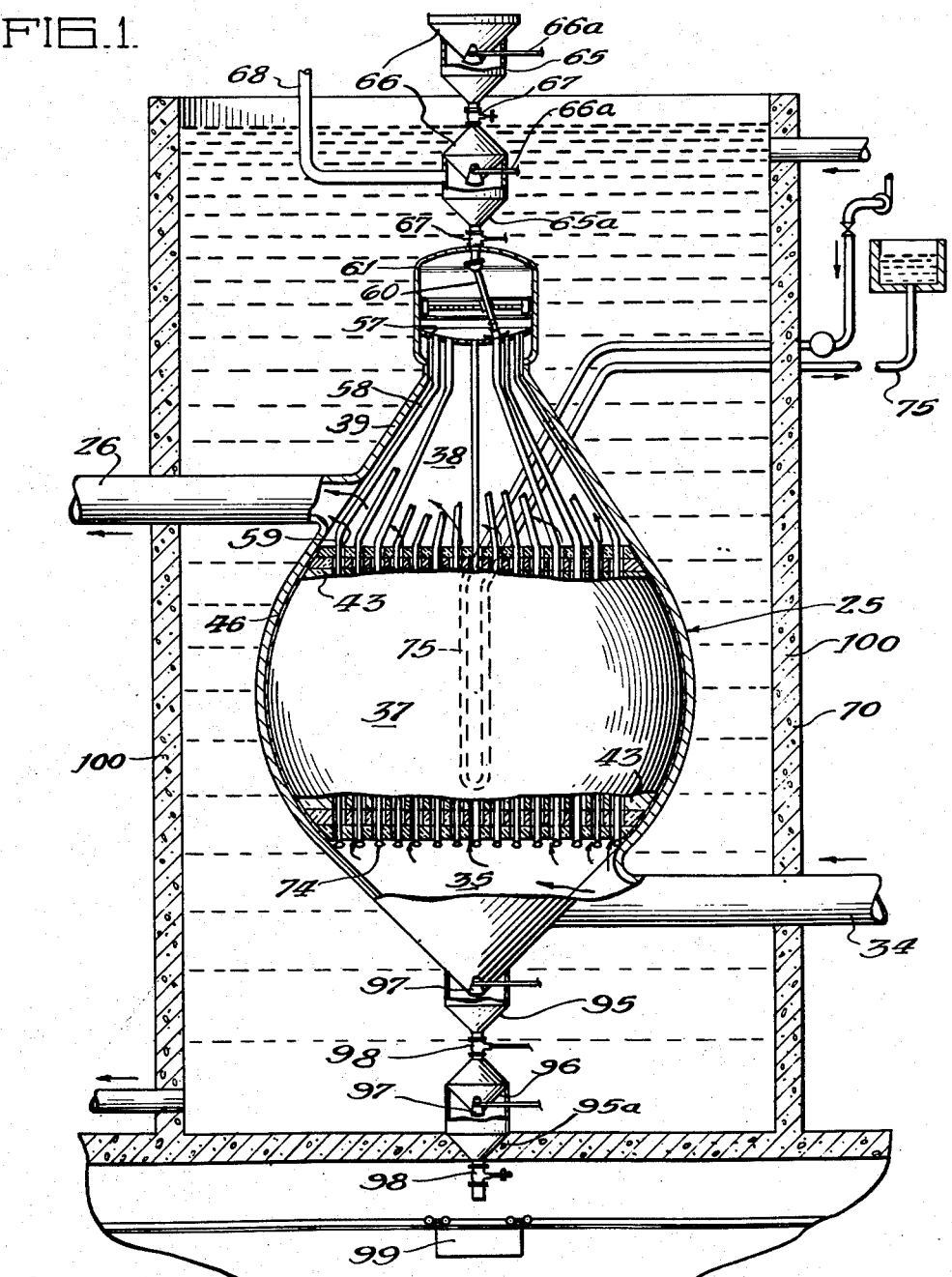

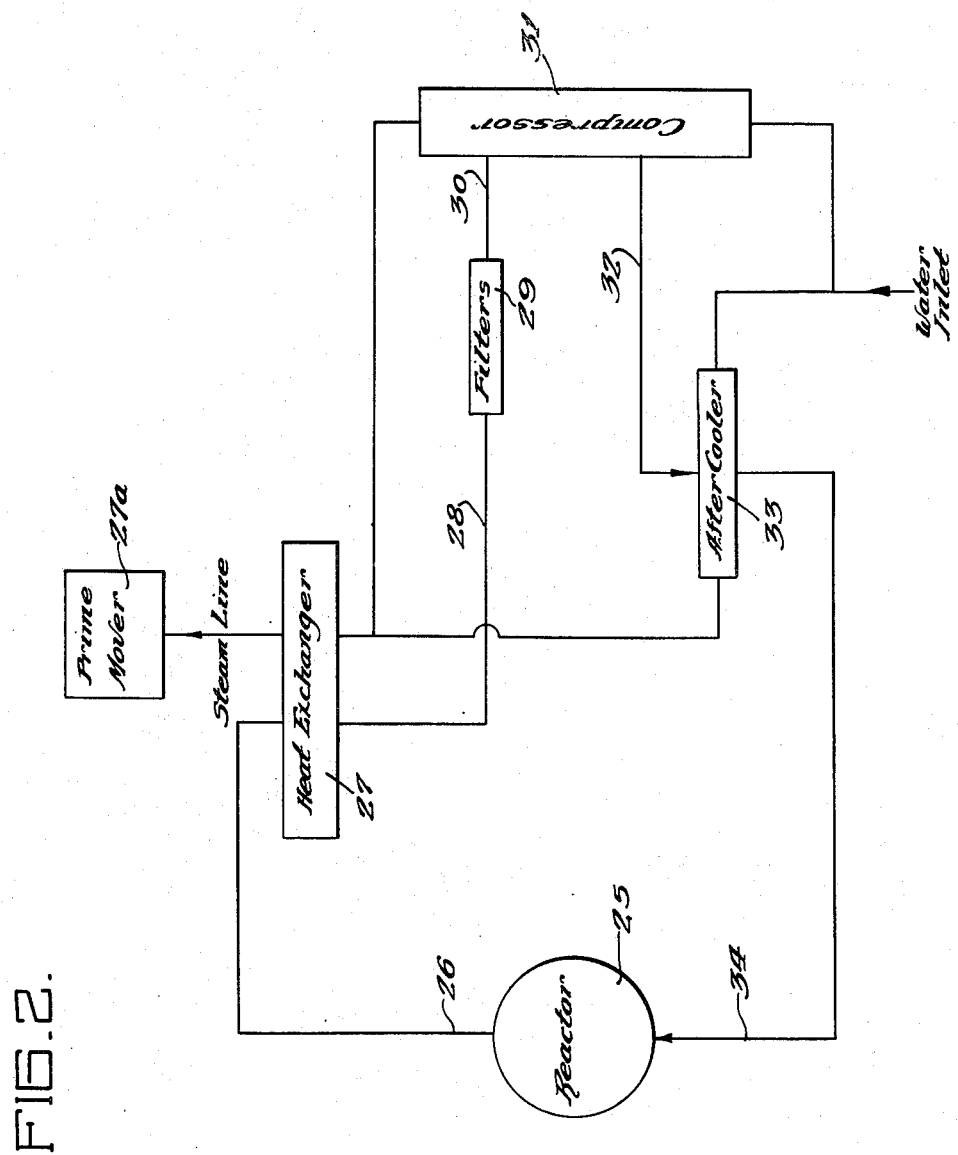

Witnesses:
Robert E. Udolf
John B. Willard

Inventor:
John A. Wheeler
By
Robert A. Ravenscroft
Attorney

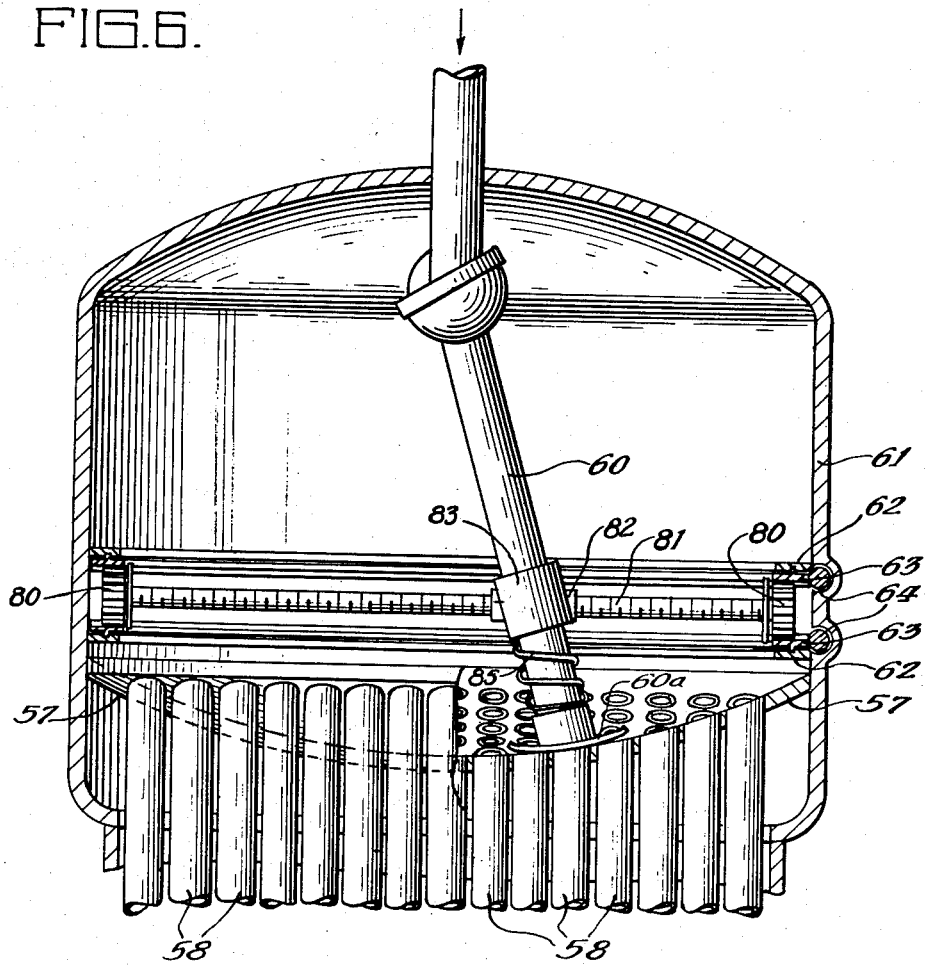

United States Patent Office 2,782,158
Patented Feb. 19, 1957

2,782,158
NEUTRONIC REACTOR

John A. Wheeler, Richland, Wash., assignor to the United States of America as represented by the United States Atomic Energy Commission Application November 2, 1945, Serial No. 626,376

1 Claim. (Cl. 204—193)

The present invention relates to the subject of nuclear fission, and more particularly to a neutronic reactor wherein cooling is accomplished in a uniform and efficient manner and wherein the products of the fission process are readily removable from the reactor without dismantling the plant.

In neutronic reactors a neutron fissionable isotope such as $U^{233}$, $U^{235}$, or $94^{239}$ or a mixture of two or more of them is subjected to fission by absorption of neutrons, and a self-sustaining chain reaction is established by the neutrons evolved from the fission. In general, such reactors comprise bodies or compositions containing such fissionable material as, for example, natural uranium, disposed in a neutron slowing material which slows the neutrons to thermal energies. Such a slowing material is termed a neutron moderator. Carbon, beryllium, and $D_2O$ are typical moderators suitable for such use. Heat is evolved during the reaction, and is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, granted May 17, 1955, and in copending application of Enrico Fermi and Miles C. Leverett, Serial No. 578,278, filed February 16, 1945.

The present invention is concerned with improvements in the form and disposition of fissionable material in a reactor; a novel structure and method of cooling and extracting the heat from the fissioned material in the reactor; and in a novel structure and method facilitating ready insertion and removal of the fissionable material and products from the reactor.

The provision of these and related features in a neutronic reactor constitute some of the principal objects and advantages of the present invention, others of which will become apparent from the following description read in conjunction with the drawings, in which:

Fig. 1 is a diagrammatic vertical sectional view, partly in elevation, of a neutronic reactor embodying the teachings of the present invention;

Fig. 2 is a flow diagram illustrating the reactor and a heat extraction system;

Fig. 6 is an enlarged cross-sectional view, partly in elevation, of the shot distributing mechanism of the reactor shown in Fig. 1.

Figure 4:
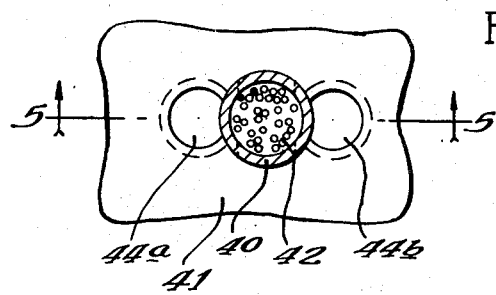
Fig. 4 is an enlarged transverse cross-sectional view through a fissionable material column and connecting cooling ducts.

Referring to Fig. 2, a neutron chain reaction is effected in a reactor 25. The heat generated by virtue of the chain reaction is carried away by helium, or a similar inert coolant, through outlet 26. The heated helium may be converted to mechanical power by passing it through a heat exchanger 27 to provide steam for activating a suitable prime mover 27a. The cooled helium from the heat exchanger 27 then passes through a conduit or pipe 28 into filters 29, which remove any solid matter from the helium, and thence into a battery of water cooled compressors 31 through a pipe 30. The compressors 31 may be of the centrifugal or reciprocating type although the former is generally preferable. For most efficient heat removal, the helium in the reactor 25 is maintained under pressure, and for that reason the compressors 31 serve to establish and maintain the pressure and also serve as pumps to circulate the helium. The high pressure gas leaves the compressors 31 through suitable piping 32, and the heat resulting from the compression is removed from the gas in after-coolers 33. From these coolers 33, the helium gas is returned to the reactor 25 through piping 34. After-coolers 33 may be used to preheat water to be turned into steam in exchangers 27. Similarly, the jackets of the compressors 31 can be used to preheat the feed water for exchanger 27. During operation the heat exchanger may become more or less radioactive due to the radioactivity of the passing helium. As a consequence cleaning of the exchanger may become difficult. In order to minimize the necessity for cleaning, it is found desirable to use water treated for reduction of its scale forming and corrosive properties in the heat exchanger.

In a preferred embodiment, the pressure of the helium gas entering the reactor 25 is 115 pounds per square inch, and the temperature is 120 degrees Fahrenheit. About 400,000 pounds of gas are circulated through the reactor shown herein per hour. The gas leaves the reactor at a pressure of 103.6 pounds per square inch and at a temperature of 800 degrees Fahrenheit.

Referring to Fig. 1, the reactor 25 is generally spherical in shape and has a lower chamber 35 which serves as an inlet for helium coolant, and as a discharge chamber for fissionable material. Above the chamber 35 is a valve housing which accommodates uranium discharge valves 74 presently to be described. A uranium-graphite lattice is contained in chamber 37, above which is a hot gas discharge chamber 38 formed by a conical dome 39. The shell segments forming the several aforesaid chambers are welded together so as to form one integral shell, which, as noted, is generally of spherical shape so as to give added strength to withstand the relatively high pressures existing in the shell.

Figure 3:
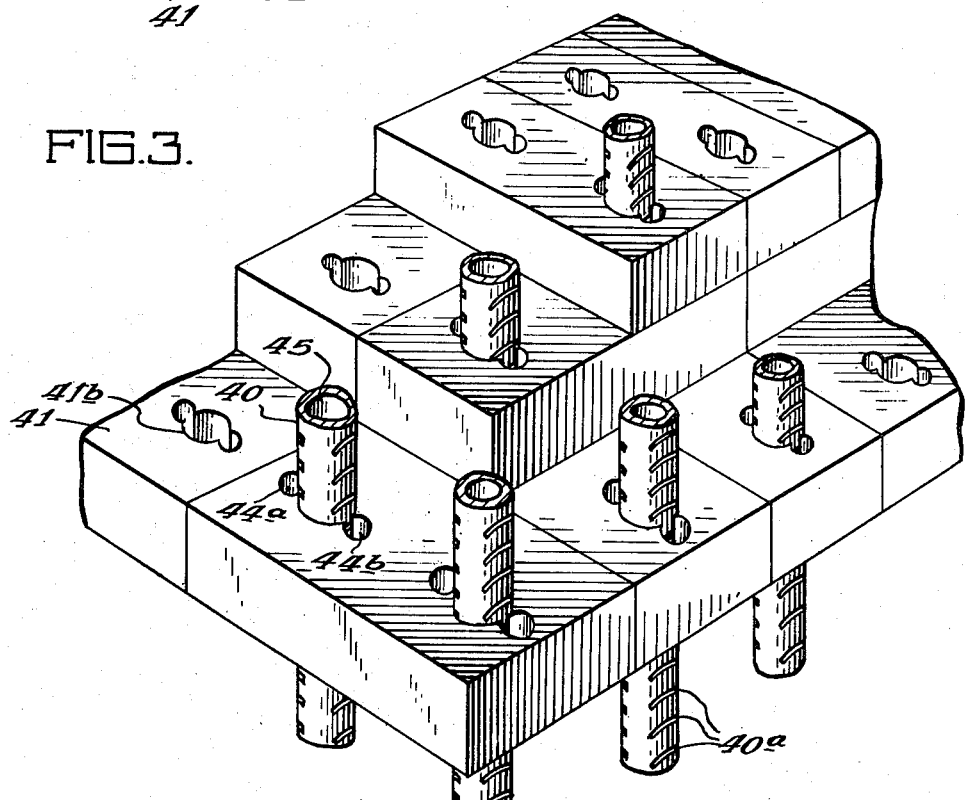
Fig. 3 is an enlarged perspective view of a portion of the reactor showing fissionable material columns and the connecting cooling ducts.
Figure 5:
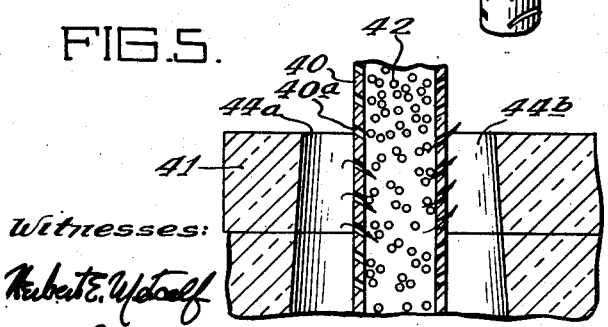
Fig. 5 is a cross-sectional view on the line 5—5 of Fig. 4.

Referring to Figs. 3–5, the lattice structure comprises graphite cartridges or columns 40 surrounded by graphite bricks 41. Each of the columns 40 is provided with a longitudinal passage 45 which extends through the entire length of the column and contains uranium in the form of spherically shaped fissionable aggregates or shot 42. A high-grade graphite is preferably employed for the columns and the matrix of the lattice structure. Surrounding the lattice is dead graphite 43 (Fig. 1), which need not be as pure graphite as that employed in the lattice.

The graphite columns 40 are arranged vertically and extend from the bottom of the lattice to the top. The columns are disposed in parallel rows, as indicated in Figs. 1 and 3, so that the uranium in the graphite is arranged in a square lattice.

The graphite bricks 41 are piled on top of each other, as shown in Fig. 3, and doweled together by means of the columns 40 passing through holes 41b. As illustrated, the bricks are 22 inches long and have a cross section 11 inches by 2½ inches. Each brick is drilled to provide the holes 41b through which the graphite columns 40 extend. Diametrically disposed relative to each hole 41b and communicating therewith as shown is a pair of holes 44a and 44b providing supply and exhaust ducts or manifolds, respectively, for the helium coolant supplied to the aggregates 42. Each hole 41b and the associated pair of holes 44a and 44b may be considered to form a single opening extending through the graphite blocks 41, of which opening the hole 41b comprises a central portion and the holes 44a and 44b comprise oppositely disposed side portions. To this end, each of the columns 40 is saw cut to provide through the walls thereof two diametrically opposite rows of slit orifices 40a that distribute the helium coolant from the inlet manifolds 44a through the aggregate filled column to the outlet manifold 44b and thereby provide uniform parallel cooling. The slit orifices are cut downwardly and inwardly through the walls of the column, and are of lesser width than the diameter of the uranium shot 42, thereby preventing the escape of the shot from the columns. The number of spaced slits in each column may be varied at successive heights in order to regulate the volume of coolant supplied to the fissioning aggregate at the various points since the heat intensity varies.

As the lattice structure is being built, the graphite bricks 41 are piled up so that the holes 41b are in alignment to form continuous vertical passages from the bottom to the top of the pile. Likewise, the holes 44a and 44b are aligned to form continuous vertical passages. No holes 44a are provided in the top layer of bricks and no holes 44b are provided in the bottom layer of bricks, thus sealing the top of the inlet column formed by the holes 44a and the bottom of the outlet columns formed by the holes 44b. Sufficient space is provided between adjacent bricks 41 and between the columns 40 and the bricks 41 to permit expansion of the graphite.

Most of the heat generated as a result of the neutron chain reaction is produced in the center portion of the lattice structure and progressively less heat is generated toward the outside of the structure. Because of this, it is desirable that a greater amount of helium gas pass through the central portion of the lattice structure than through the outside portions. A satisfactory way for controlling the flow of the helium gas through the passages in the graphite columns is to taper the throat or constriction in the inlet and outlet manifolds formed by the aligned holes 44a and 44b so as to create greater resistance to the flow of the gas through the outer portions of the pile. In this manner, by providing the narrowest throat or constriction adjacent the outermost columns (Fig. 5) and further by gradually increasing the diameter of the constrictions in the passages toward the center of the lattice structure, it is possible to selectively control the amount of gas flow through the various locations in the lattice so as to most effectively remove heat from the system. Inasmuch as there is approximately only 50 percent free volume through the uranium bodies 42, the velocity of helium gas passing through the uranium is considerably greater than the velocity of the gas passing through the inlet and outlet passages formed by the holes 44a and 44b in the graphite columns.

The average mass velocity of the helium passing through the ducts in the lattice is about 5.56 pounds per second per square foot, while the maximum is at the center of the lattice and is approximately 12.8 pounds per second per square foot. The average linear velocity of the gas in the ducts is about 75 feet per second and the maximum at the center of the lattice is about 170 feet per second. The average mass velocity of the helium gas in the uranium elements 42 is 8.83 pounds per second per square foot, while the maximum is about 20.4 pounds per second per square foot. The average linear velocity of the gas in the elements is about 175 feet per second, while the maximum is 404 feet per second. On an average, about 712 pounds of helium gas per hour pass through each column, the centermost columns conveying the most, the maximum for one column being approximately 1640 pounds per hour. The heat transfer coefficient for the average column is about 163 B. t. u.'s per hour per square foot per degree Fahrenheit, while the coefficient for the centermost columns is about 318 B. t. u.'s per hour per square foot per degree Fahrenheit. 400,000 pounds of helium are circulated per hour, removing the heat equivalent of 100,000 kilowatts from the reactor. The power required for circulating the helium and running the auxiliaries of the plant is about 12,000 kilowatts, leaving a net power of around 88,000 kilowatts available to form steam for external use. The uranium disposed in shot form as illustrated is provided with a relatively large amount of surface for cooling. One-half inch shot is satisfactory, each weighing about .045 pound. This weight refers to the ½ inch volume for uranium metal shot. If uranium carbide is used, the weight of each shot is about .031 pound. The overall mass ratio of graphite to uranium in the lattice is 5.4. The lattice structure is in the form of a cylinder 28 feet in diameter and 26 feet high and has a two foot layer of dead graphite at the top and a layer on the sides varying in thickness from 1 foot to 4 feet. These figures represent an operative lattice, but, of course, the invention is not intended to be limited to this specific example.

As shown in Fig. 1, a space is left between the dead graphite layer 43 and the shell of the reactor and this space is filled with shredded asbestos 46 to a thickness of about one inch. The graphite will expand and contract as a result of the heat generated in the lattice and for this reason the space must be provided. The asbestos layer will compress to permit this expansion but will serve to prevent leakage of helium gas through this space so that the gas cannot by-pass the lattice.

The inside surfaces of the reactor shell may be coated with some suitable material to prevent corrosion of the metal.

As pointed out above, most of the heat generated by the chain reaction is generated in the uranium and is produced toward the center of the lattice, and consequently in this region a greater amount of the circulating cooling medium should be provided on or adjacent to the uranium, and particularly in the central area of the reactor, than elsewhere in the structure. This is effected, as illustrated in Fig. 5 and indicated above, by increasing the diameter of the inlet and outlet ducts formed by the aligned holes 44a and 44b and by increasing the number of orifices 40a in the columns 40 at the center of the lattice, and thereby passing a larger amount of coolant through the shot 42 at the center of the lattice. Intermediate conditions exist in the lattice structure in positions outwardly from the center of the lattice. Thus, for intermediate positions, the diameter of the coolant inlet and outlet ducts is reducted and the number of column orifices decreased the farther they are located from the center.

In operation, the cool helium gas enters the reactor 25 through the pipe 34, passes upwardly in the direction of the arrows through vertical inlet manifolds 44a, continues inwardly through the orifices 40a into cooling contact with the uranium shot 42 and then outwardly into the outlet manifolds 44b, upwardly into the exhaust chamber 38, and finally as hot gas leaves the reactor 25 from the discharge chamber 33 through discharge pipe 26 and passes through the cooling circuit shown in Fig. 2.

At the top of the graphite 43 over each column 40 is a guide pipe 58 (Fig. 1) socketed at its lower end in the graphite at 59.

Referring to Fig. 6, the guide pipes 58 above the top of the conical gas discharge chamber 33 are secured by a concave selector plate 57 so that a universally jointed supply pipe 60 is capable of selectively supplying each of the pipes 58 individually with the uranium shot 42. The pipe 60 is located within a housing 61 having opposed ring gears 63 rotatable in guides 62 and selectively driven by edge engaging individually rotatable worm gears 64 operable from a remote point. Two diametrically opposed gears 80 having suitably cut teeth are disposed between and are rotated by the ring gears 63. One gear 80 is fixedly connected to a threaded shaft 81, the other being connected to the shaft 81 for free rotation in respect thereto. A rider nut 82 is threaded on the shaft 81, and is pivotally connected to a sleeve 83 through which the supply pipe 60 extends for control thereof. Manifestly, selective rotation of the two worm gears 64 disposes the outlet of the pipe 60 over any selected guide pipe 58. When the gears 64 are rotated in the same direction, the threaded shaft 81 is moved angularly about a vertical axis transverse to its length and carries the supply pipe 60 circularly at a constant radius to various tubes 58. When the gears 64 are rotated in opposite directions, the threaded shaft 81 rotates about its own horizontal axis and shifts the nut 82 radially along the shaft 81, the nut carrying the pipe 60 to various pipes. Rotations of the threaded shaft 81 about its own horizontal axis and about a vertical axis transverse to its length or its horizontal axis enables the supply pipe 60 to be brought to the tops of all the tubes 58. To facilitate the transfer of shot, the discharge end or outlet of the supply pipe 60 is provided with a loose fitting sleeve shoe 60a which is spring urged into contact with the selector plate 57 by a spring 85. If desired, the lower part of the pipe 60 may be bent to dispose the discharge end thereof beneath the shaft 81, an arrangement which may be necessary for loading all guide pipes 58 when the same are quite close together.

As illustrated in Fig. 1, in order to maintain the helium coolant under pressure, the uranium shot is fed to the pipe 60 through a pair of locks 65 and 65a located in series. Each lock 65 and 65a comprises a water-tight chamber or hopper 66 having a bucket dump valve 66a for retaining and releasing shot therein, and a fluid valve 67 for maintaining the helium in the system under pressure. The dump valves 66a may be Sylphon actuated by hydraulic controls (not shown) and the fluid valves 67 may be any of the customary one-way type so as to permit passage of uranium shot downward therethrough and when not so actuated, resume a normal closed position preventing upward escape of helium.

The structure thus far described is enclosed in a tank 70 containing water to a level covering the lower lock 65a. The water serves to detect leakage of helium from the system and to absorb radioactive emanations. Suitable gland packing is provided so that the reactor 25 is water tight at all points where valve or other controls extend through the reactor shell.

A suitable valve controlled feed line 68 is connected to the lower control lock 65a for supplying fresh helium to the system to compensate for losses of operation.

At the bottom of each of the columns 40 is a dump valve 74 for retaining in and discharging from the column the uranium shot 42 therein. Each valve 74 is preferably individually operable by a suitable remote control (not shown), such controls permitting selectively individual or group operation of valves 74. The valves 74 may be Sylphon actuated type, solenoid actuated gate-slide type, or any other suitable type. The particular valve 74 per se forms no part of the present invention, and, hence, the valve is diagrammatically shown.

During the operation of the present device, the transuranic element 94 is produced, together with radioactive fission products. After long periods of operation, the fission products may so poison the materials in the device by neutron absorption as to lower the reproduction ratio of the system. In order to perpetuate the chain reaction, it is essential that the value of the reproduction ratio remain above unity. Thus it may be desirable to remove the fission products from the lattice from time to time. This is done by removing the uranium from the lattice and replacing it with fresh material. The radioactive fission products and element 94 can then be separated from the uranium by extraction methods. The radioactive fission products are useful in medicine as radiation sources, and element 94, being fissionable in a manner similar to $U^{235}$, may be used to enrich natural uranium to increase its efficiency in chain reacting systems. The separation processes form no part of the present invention, so that no purpose will be served in describing herein the details thereof.

Dump valves 74 are especially useful in case of extreme emergency to prevent the reactor from being destroyed in case of failure of the control and safety system to effectively limit the chain reaction to safe values. All or part of the uranium bodies can be dumped rapidly into chamber 35, destroying the geometrical arrangement of the uranium bodies in the graphite and thus preventing the maintenance of the chain reaction. Such procedure is only resorted to after failure of the control and safety system. The dumping may be manual and/or automatic upon rise of the neutron density in the system to a dangerous level.

The uranium shot 42 is removed from the reactor chamber 35 through a pair of locks 95 and 95a located in series. Each lock comprises a large chamber or hopper 96 having a bucket dump valve 97 for retaining and releasing the shot 42 therein, and a motor actuated fluid valve 98 for retaining the helium in the reactor under pressure. In removing the shot from the reactor, the valves of the lower hopper or lock 95a remain closed whenever the valves of the upper lock 95 are opened and shot is being discharged into the lower lock. Thereafter, the valves of the upper lock 95 are closed before the valves of the lower lock are opened and the shot is discharged into suitably shielded conveyors 99 for transfer to a separation plant (not shown).

A series of tuyeres (not shown) may be provided in the lower lock 95a to carry the helium coolant into a purifying tank (not shown) and to cool the charge of shot 42 during the storage period.

A self-maintaining chain reaction, once started, must be controlled, for otherwise the neutron density may increase so rapidly that the reaction will reach violent proportions. The rate of heat generation in the lattice may exceed the rate of heat removal by the heat extraction system so that the temperature in the reactor will rise beyond a safe limit, even to the point of causing the uranium to melt with resulting break-down of the lattice structure.

As illustrative of a suitable control system, a closed end pipe line 75 (Fig. 1) extends through the lattice containing a suitable neutron absorber such as, for example, mercury. When the line 75 is completely filled with mercury, neutrons are absorbed in an amount sufficient to stop any neutron chain reaction. By subjecting one end of the line 75 to fluid pressure, sufficient mercury can be forced into a reservoir outside of the lattice so as to permit maintenance of the chain reaction. Control of the pressure on the mercury, therefore, provides control of the chain reaction. Failure of the control system to maintain the necessary fluid pressure permits the mercury to drain from the reservoir into the lattice and to stop the chain reaction.

The absorption of the neutrons by the mercury control column is accompanied by considerable heat. Therefore, the control column or pipe 75 may contain a concentric inner hollow tube (not shown) through which cooling water can be circulated. The water may then be conveyed externally of the pile through a suitable cooling circuit (not shown) and then returned to the cooling tube.

The construction of the lattice is commenced with the excavation for the foundations for the reactor shell proper and for a concrete structure or shield 100 containing the water in which the reactor is immersed. The reactor shell itself, with its underground connections, dump valves, and graphite supporting beams is then built up and any necessary elevators and temporary superstructure required are erected. The graphite bricks 41, which have previously been machined and bored, are then laid and the mercury control piping 75 is installed. When all the graphite bricks are laid, a temporary platform is laid over the top of the graphite bricks, the platform being provided with a hole directly over the location of each of the graphite cartridges. With a special reaming tool, each hole through the graphite is properly gauged throughout its length to detect the presence of any shoulders or projections, and such projections and shoulders are removed with the reaming tool. Following this operation, the temporary platform is removed and the dead graphite shield is completed to its final thickness of about three feet. The guide pipes 58 are then inserted in place and suitable thermo-couples (not shown) for measurement of temperature within the reactor adjacent the point at which the cooling fluid is removed, installed on them. The conical dome 39 is then constructed, the selector pipe 60 and housing 61 installed and the loading locks 65 and 65a and valves 66a and 67 assembled. The piping for the helium gas is then installed and fitted to the reactor shell and the concrete shield 100 is poured. The mechanisms for operating the mercury control system are finally installed in their proper place, and the entire unit is then in condition for operation except for the loading of the uranium.

Each cartridge is individually loaded by means of the loading locks 65 and 65a and the selector pipe 60.

During the loading of the uranium, the control system is entirely filled with mercury within the lattice. As the charging of the uranium approaches the quantity necessary to produce an operating lattice, the loading operation will be suspended long enough for trial runs to be made. During the trial runs, the mercury is gradually forced out of the control pipe 75. Readings of the neutron density are made by the use of indium foils inserted in the lattice. The indium foil may be placed in a spherical container and the container inserted in one of the columns 40 for a predetermined period of time, during which the foil is subjected to neutron bombardment. The column 40 in which the indium foil is placed may be filled to any desired level with graphite shot before the foil is inserted so that the foil rests on the top of the dead shot at the desired level to be tested in the lattice. Then the graphite shot and the foil are removed, and by suitable Geiger-Mueller counters, the beta radiations from the indium foil radioactivity created by the neutron bombardment are counted. When it is found by this experimental means that the quantity of uranium in the lattice will support a chain reaction at the highest temperatures contemplated, the loading of the uranium is discontinued. All empty portions of the columns are then filled with graphite shot so as to complete the lattice structure. The ratio of graphite to uranium and the size of the uranium shot may be determined in accordance with the principles discussed in the aforesaid copending application of Fermi and Szilard.

The power plant above described is ideally adapted for automatic control to maintain the neutron density within the reactor substantially constant at a predetermined level, and thus give a substantially constant power output. Due to the fact that large masses of materials are utilized in the reacting portion of the structure, there is a temperature lag therein. Consequently, it is convenient to monitor and control the reaction by means of ionization chambers which will measure the neutron density at the periphery of the lattice portion of the structure. As the rate of neutron diffusion out of a chain reacting system is always proportional to the rate of generation of neutrons within the structure, the ionization chambers can be placed at the periphery of the pile or lattice, and in fact are preferably so positioned in order that they be not subjected to the extremely high neutron densities existing within the lattice.

It is desirable to point out the manner in which the mercury control 75 operates to regulate the neutron density. In any self-sustaining chain reacting structure adapted to produce power, the neutron multiplication ratio of the system must be greater than unity. For any value over unity, by an amount sufficient to overcome losses in the system, the chain reaction becomes self-sustaining and the neutron density without control will increase exponentially in point of time, until the device is destroyed. For proper control, the system must be held in balance by maintaining the chain reaction at some point where the production of new neutrons is balanced with the neutrons initiating the chain. Under these conditions, the reacting portion of the structure will continue to maintain the neutron density therein which obtained when the system was balanced.

However, in order to enable the reactor to reach a desired neutron density, the system must be permitted, for a period of time, to rise in neutron density until the desired density is reached. After the desired density has been reached, it is necessary thereafter to hold the system in balance.

Inasmuch as the reproduction ratio of the lattice structure is reduced by the presence of neutron absorbing impurities, such impurities can be introduced in the lattice in the form of a column of mercury which will absorb large amounts of neutrons. The amount of mercury in the lattice will determine the reproduction ratio of the lattice and a range can be obtained between a condition providing a neutron reproduction ratio which is greater than unity and a condition at which no chain reaction can be maintained. The exponential rise of neutron density can be made relatively fast or relatively slow in accordance with whether the multiplication ratio is permitted to be much greater than one, or only slightly greater than one. There is a small percentage of delayed neutrons emitted in the fission process. These delayed neutrons cause the neutron density to rise in an appreciable time rather than almost instantaneously. The time for doubling the neutron density increases as the multiplication ratio approaches unity, and by adjustment of the level of mercury in the control pipe 75, any desired rate of rise can be obtained up to the maximum corresponding to the reproduction ratio characteristic of the given structure when all the mercury is removed.

The broad method of control preferred is to withdraw all mercury from the structure to a point where there is an exponential, and preferably slow, rise in neutron density within the structure. When a desired neutron density has been reached, the mercury is then returned into the pile to a point where the reaction is balanced. This balance is then maintained so as to maintain a constant power output in the reactor. The maintenance of the balance point with the mercury control system would be relatively simple were it not for the fact that changes in temperature change the reproduction ratio of the structure slightly, and in any chain reacting structure where there is any variation of pressure of the circulating medium for example, or in atmospheric pressure in case of a structure exposed to the atmosphere, the reproduction ratio of the system will slightly change. It is desirable, therefore, that the controls be so manipulated that they maintain a constant neutron density within the system. Such a method of control may be accomplished by automatic control of the air pressure system that regulates the mercury column by means of an ionization chamber measuring neutron density, positioned within the reactor close to the lattice.

Furthermore, due to the exponential rise of neutron density within the reacting structure when the multiplication ratio is greater than unity, all possible precautions must be taken to prevent a continued exponential rise in neutron density in case of failure of the mercury column 75 to return to the balance position. For this reason additional mercury columns (not shown) may be provided within the lattice which may be immediately filled with mercury from standby mercury reservoirs in the event of an abnormally high exponential rise. In case the neutron density has risen to a very large figure before the safety columns operate, it might then be impossible for the mercury therein to absorb a sufficient number of neutrons to reduce a dangerously high neutron density to safe limits in a sufficiently short period of time. Under these circumstances, there is no alternative but to dump the uranium shot and thus destroy the lattice arrangement by which the self-sustaining chain reaction is made possible.

While the invention has been described with reference to a single embodiment, it is to be understood that it is not limited to the specific neutronic reactor. Many variations will be apparent to those skilled in the art and the invention is, therefore, to be limited only by the scope of the appended claim.

What is claimed is:

A neutronic reactor comprising a graphite mass having a plurality of parallel spaced openings extending therethrough between opposite faces, each opening having a central portion and oppositely disposed side portions, a plurality of graphite tubes, each tube fitting only in the central portion of an opening and having diametrically opposed slits providing communication at a plurality of regions along the length of the tube between the interior of the tube and the side portions of the opening, a plurality of uranium-containing spheres in each graphite tube, means for supplying helium under pressure to the end of one side portion of each opening located at one of said opposite faces of the graphite mass, means closing the end of the other side portion located at said one opposite face of the graphite mass, means for exhausting helium from the end of said other side portion of each opening located at the other of said opposite face of the graphite mass, and means closing the end of said one side portion of each opening located at said other opposite face of the graphite mass, whereby helium forced into the graphite mass at said one side portion of each opening must pass through the slits in the graphite tube in the central portion of the opening and over the uranium-containing spheres in the graphite tube in order to exit from the graphite mass at the other side portion of each opening.

References Cited in the file of this patent

UNITED STATES PATENTS

| | | |
|---|---|---|
| 1,929,408 | Bunce | Oct. 10, 1933 |
| 2,399,951 | Suits | May 7, 1946 |
| 2,556,349 | Trautman | June 12, 1951 |
| 2,708,656 | Fermi et al. | May 17, 1955 |

FOREIGN PATENTS

| | | |
|---|---|---|
| 754,609 | France | Aug. 28, 1933 |
| 487,983 | Great Britain | June 29, 1938 |
| 114,150 | Australia | May 2, 1940 |
| 861,390 | France | Oct. 28, 1940 |
| 233,011 | Switzerland | Oct. 2, 1944 |

OTHER REFERENCES

A General Account of the Development of Methods of Using Atomic Energy for Military Purposes, by H. D. Smyth, Supt. of Doc., Wash., D. C., August 1945, pp. 22–25, 42, 83, 102–104.

Goodman: "The Science and Eng. of Nuclear Power," vol. 1, p. 275, Addison-Wesley (1947).

Kelly et al.: Phy. Rev. 73, 1135–9 (1948).

Harwell: The British Atomic Energy Establishment, 1946–1951. London, 1952, pp. 39–42.